(No Model.)
G. NEU.
Window Guard.
No. 240,167. Patented April 12, 1881.
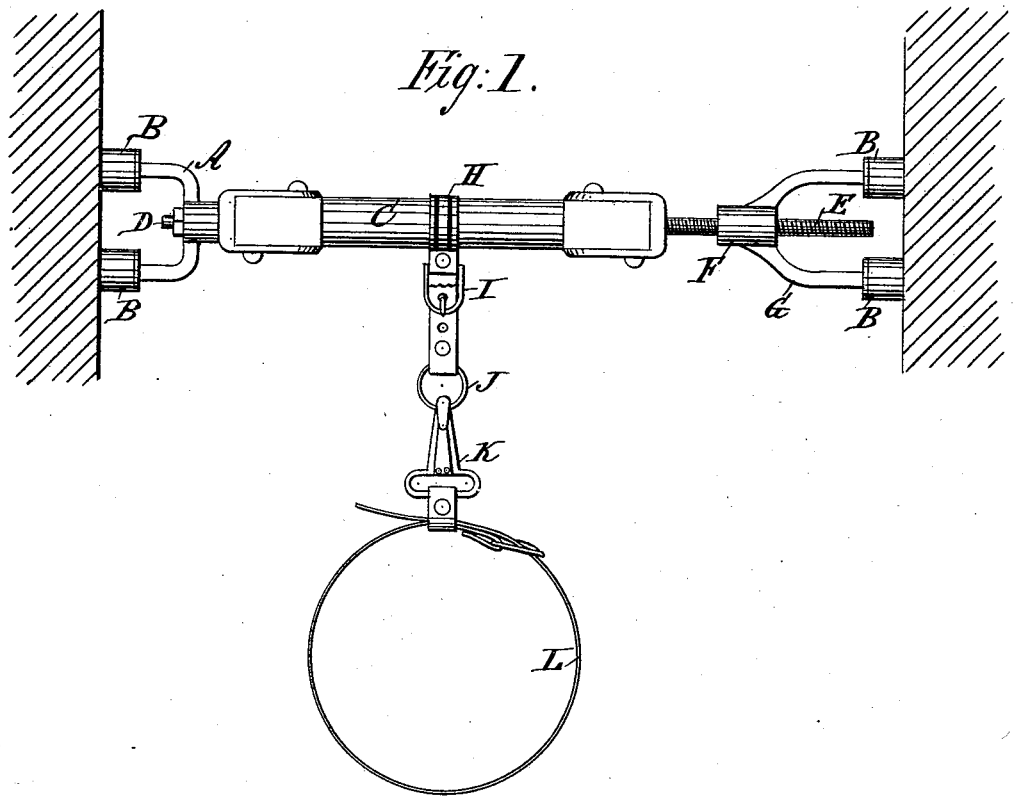
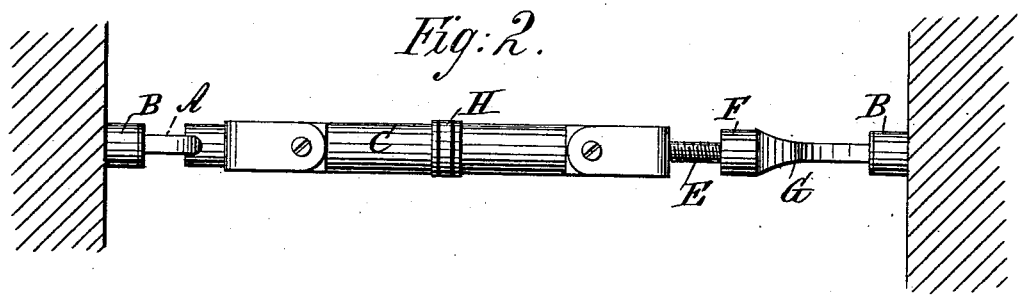
WITNESSES:
A. Schehl.
C. Sedgwick
INVENTOR:
G. Neu
BY 
ATTORNEYS.

UNITED STATES PATENT OFFICE.

GEORGE NEU, OF CINCINNATI, OHIO.

WINDOW-GUARD.

SPECIFICATION forming part of Letters Patent No. 240,167, dated April 12, 1881.

Application filed October 23, 1880. (No model.)

*To all whom it may concern:*

Be it known that I, GEORGE NEU, of Cincinnati, in the county of Hamilton and State of Ohio, have invented a new and Improved Window-Guard, of which the following is a specification.

The object of my invention is to provide a new and improved window-guard for the safety of persons engaged in cleaning or repairing windows, which guard is simple in construction, and is durable and convenient.

The invention consists in a bar having a swiveled fork attached to one end and a screw passing into a fork attached to the other end, to lock this bar in the window-frame, so that it can hold the person by means of a strap passing around the bar and attached to a belt passing around the person engaged with the window.

In the accompanying drawings, Figure 1 is a front view of my improved window-guard, showing the manner in which it is held in the window. Fig. 2 is a plan view of the same.

Similar letters of reference indicate corresponding parts.

The swivel-fork A, provided with a rubber or like cushion, B B, at the end of each prong, is attached to the end of the bar C by means of a pintle, D, fastened to the end of the bar. A screw, E, is fastened to the other end of the bar C, and passes through a threaded center, F, of a fork, G, also provided with rubber or like cushions B B at the ends of the shanks. A strap, H, provided with buckle I, for lengthening or shortening it, fits into an annular groove at or near the middle of the bar C, and is preferably riveted to form a ring closely fitting into the groove, so that it cannot be removed from the same. A ring, J, is attached to the loose end of the strap H, and a snap-hook, K, attached to a belt or girdle, L, catches in this ring. The belt is provided with a buckle, to adjust it according to the size of the person.

Instead of the fork A, any other suitable swiveled block may be attached to the end of the bar C.

The window-guard is used as follows: The person fastens the belt L around the waist, and then sits in the window with the back toward the outside, and has the bar C resting upon the lap. The bar C is then revolved until the cushions B B are forced against the window-frame with sufficient force to hold the bar firmly, for by revolving the bar C the fork G is moved toward the end of the screw—that is, the bar is lengthened. As soon as the bar is firmly secured in the window-frame, the snap-hook is passed into the ring J, and the person will be held by this strap, if by accident he should fall back, and as the bar is directly above the lap it does not interfere with the movements of the person. The strap H fits loosely in its groove, and will not fly around when the bar C is being revolved.

The bar alone may be used, if desired, and the person may hold on it with one hand and work with the other.

Having thus described my invention, what I claim as new, and desire to secure by Letters Patent, is—

1. A window-guard made substantially as herein shown and described, and consisting of a bar, C, provided with a swiveled fork or bearing, A, at one end, and a screw, E, and fork G at the other end, as set forth.

2. The combination, with the bar C, of the swiveled fork A, the screw E, the fork G, the strap H, and the belt L, substantially as herein shown and described, and for the purpose set forth.

3. The combination, with the bar C, of the swiveled fork A, the screw E, the fork G, the strap H, held in an annular groove, the ring I, snap-hook K, and belt L, substantially as herein shown and described, and for the purpose set forth.

GEORGE NEU.

Witnesses:
JOHN SCHERER,
JOHN KRUCK.